United States Patent [19]

Gommel et al.

[11] Patent Number: 4,600,418
[45] Date of Patent: Jul. 15, 1986

[54] AIR-INTAKE ARRANGEMENT FOR A TWO-STROKE ENGINE

[75] Inventors: Reinhard Gommel; Jürgen Laser, both of Backnang; Klaus Höppner, Marbach; Gerhard Meyer, Kornwestheim; Hans G. Salomon, Dombühl; Günter Wolf, Oppenweiler-Aichelbach; Dieter Wieland, Remseck; Hermann Weiss, Grossbottwar; Jürgen Wolf, Stuttgart, all of Fed. Rep. of Germany

[73] Assignee: Andreas Stihl, Waiblingen, Fed. Rep. of Germany

[21] Appl. No.: 693,250

[22] Filed: Jan. 22, 1985

[30] Foreign Application Priority Data

Jul. 5, 1984 [DE] Fed. Rep. of Germany ....... 3424774

[51] Int. Cl.⁴ ............................................. F02M 17/34
[52] U.S. Cl. ................................ 55/462; 55/DIG. 28
[58] Field of Search ......................... 55/DIG. 28, 462

[56] References Cited

U.S. PATENT DOCUMENTS

| 557,221 | 3/1896 | Parker | 55/462 |
|---|---|---|---|
| 2,153,069 | 4/1939 | Barr et al. | 55/DIG. 28 |
| 2,467,408 | 4/1949 | Semon | 55/462 |
| 2,963,111 | 12/1960 | Rohrbacher | 55/276 |
| 3,054,246 | 9/1962 | Jennings | 55/462 |
| 3,231,249 | 1/1966 | Kalert, Jr. | 55/DIG. 28 |
| 3,678,663 | 7/1972 | Hansen | 55/DIG. 28 |
| 3,811,417 | 5/1974 | Keenan et al. | 55/DIG. 28 |
| 4,379,770 | 4/1983 | Bianchi et al. | 55/DIG. 28 |

FOREIGN PATENT DOCUMENTS

| 412865 | 2/1946 | Italy | 55/DIG. 28 |
|---|---|---|---|
| 52-65368 | 5/1977 | Japan | 55/DIG. 28 |
| 1075376 | 7/1967 | United Kingdom | 55/DIG. 28 |
| 1351360 | 4/1974 | United Kingdom | 55/DIG. 28 |

Primary Examiner—Tim Miles
Attorney, Agent, or Firm—Walter Ottesen

[57] ABSTRACT

The invention is directed to an air-intake arrangement for a two-stroke engine for use in hand-guided, engine-driven apparatus such as motor-driven chain saws. The air-intake arrangement includes an air filter and a baffle wall for guiding fuel particles that are buffeted back out of the air induction channel by the engine. The baffle wall has a curvature to define a deflector to redirect the fuel particles in a largely gaseous state towards the carburetor. The arrangement provides an optimum air-fuel mixture which is not overrich and a trouble-free operation of the engine.

20 Claims, 6 Drawing Figures

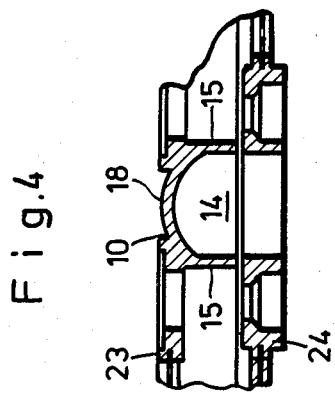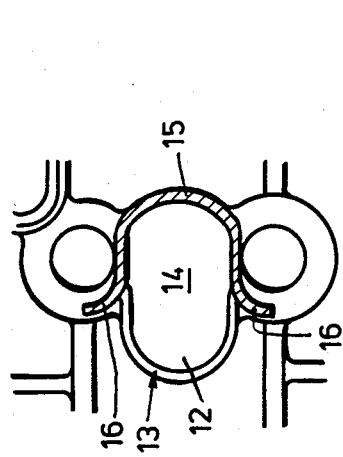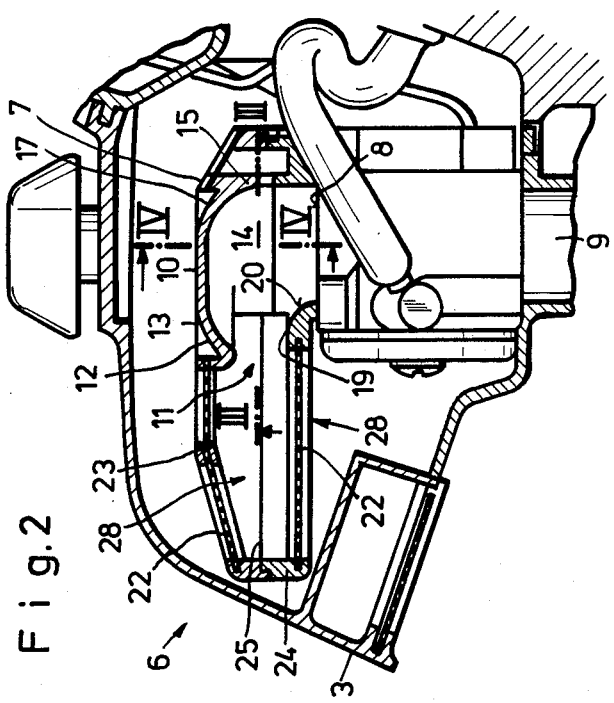

AIR-INTAKE ARRANGEMENT FOR A TWO-STROKE ENGINE

FIELD OF THE INVENTION

The invention relates to an air-intake arrangement for two-stroke engines for hand-held motor-driven apparatus such as chain saws or the like.

BACKGROUND OF THE INVENTION

In two-stroke engines, the pulsating induction flow carries fuel particles during the returning compression stroke which are deposited outside the carburetor either in the upstream air filter or in an elbow pipe located ahead of the carburetor. The fuel collecting there is entrained with the subsequent induction pulses, that is, the pulsating compression strokes operating in the direction of induction. This results in an uncontrolled supply of fuel thereby causing the inducted mixture to be excessively rich. If the fuel entrained by the pulsating return strokes is deposited in the filter itself, the filter will be subject to incrustation and premature contamination thereby affecting its resistance to flow and adversely affecting the induction ratios.

Attempts have already been made to eliminate these disadvantages by extending the induction travel upstream of the carburetor, for example, by inserting an elbow pipe between the carburetor and the air filter. However, the arrangement of such an extension requires an unfavorable mounting position of the filter. Further, the insertion of an additional extension or additional elbow pipe undesirably extends the induction region of the engine. Also, the insertion of an elbow pipe has the disadvantage that the fuel particles in the pulsating induction flow which are still in a gaseous state are deposited in the extension, that is, in the elbow pipe, and change over to a liquid state, so that fuel droplets collect in the intake manifold which are likewise entrained in an uncontrolled manner thereby greatly affecting an optimum carburetor setting.

Moreover, it is known to provide an impact surface on the inside of the filter outer wall upstream of the carburetor on which the returning pulsating induction flow, enriched with fuel particles, impinges. The fuel particles impinging on the impact surface separate in a substantially uncontrolled manner and are usually deposited there as liquid droplets to be subsequently uncontrollably entrained again by the pulsating intake air; or, the fuel particles may be deposited in the air filter as fuel droplets thereby bringing about the above-mentioned disadvantages such as contamination, incrustation, et cetera.

SUMMARY OF THE INVENTION

It is the object of the invention to improve upon a two-stroke engine so as to eliminate the disadvantages referred to above. It is a further object of the invention to provide an air-intake arrangement for a two-stroke engine that largely avoids the formation of droplets, that is, a change to a liquid condition of the fuel entrained in the return flow caused by the return strokes. In this way, an uncontrolled entrainment of fuel particles and thus an uncontrolled disadvantageous effect on the optimum induction mixture in the carburetor is prevented.

The air-intake arrangement of the invention is for the engine of a hand-guided, engine-driven apparatus such as an engine-driven chain saw or the like. The engine is equipped with carburetor means for forming an air-fuel mixture. The carburetor means includes an induction channel through which a pulsating flow of air for forming the mixture is drawn by suction developed by the engine and through which the engine periodically reverses the flow of air containing particles of the fuel in a direction opposite to a flow of incoming fresh air thereby causing the fuel particles to pass out through the inlet opening of the induction channel. The air-intake arrangement includes: an air filter disposed in the flow of fresh air ahead of the inlet opening; and, a baffle having a baffle wall portion facing the inlet opening and an arcuate wall portion extending from the baffle wall portion, the arcuate wall portion being configured so as to cause the wall portions to conjointly define a turn-around deflector for receiving the flow of fresh air and for guiding the reversed flow of air containing the fuel particles back toward the carburetor means and the engine.

Advantageous improvements as well as further advantages and essential details of the invention will become apparent from the subsequent description of preferred embodiments in conjunction with the drawing and from the claims.

BRIEF DESCRIPTION OF THE DRAWING

The invention will now be described with reference to the drawing wherein:

FIG. 2 is an enlarged section view of the air-intake arrangement of the invention shown in FIG. 1;

FIG. 3 is a partial section view of the inside of the air filter taken along the line III—III of FIG. 2;

FIG. 4 is another partial section view of the inside of the air filter taken along the line IV—IV of FIG. 2;

DESCRIPTION OF THE PREFERRED EMBODIMENTS OF THE INVENTION

Figure 1:
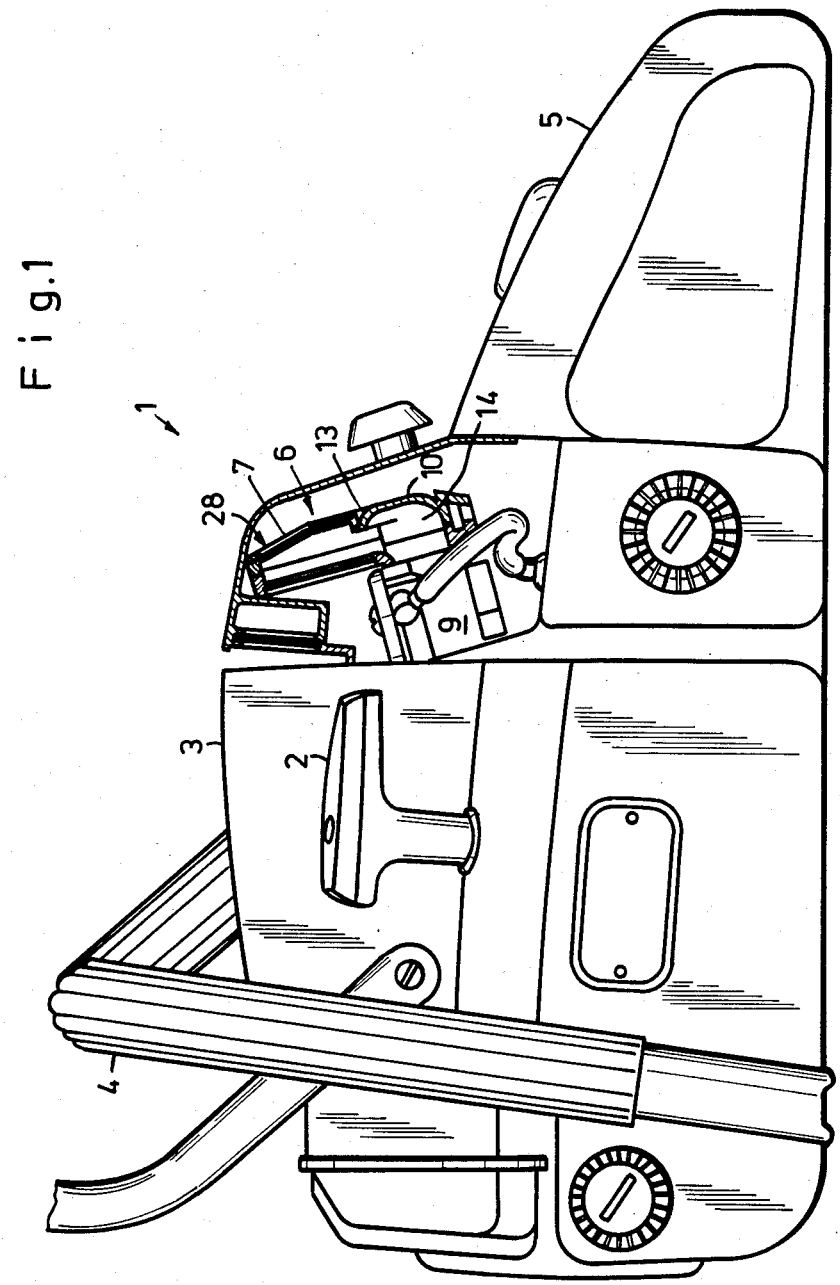
FIG. 1 is a side elevation view of the housing of a hand-guided, engine-driven tool which includes a two-stroke engine with an embodiment of the air-intake arrangement according to the invention shown partially in section.

The portable tool 1 illustrated in the drawing can be preferably a hand-guided engine-driven chain saw, lawn mower, hedge trimmer or the like. The portable tool includes a two-stroke engine adapted to be started with a pull starter 2 and located in a housing 3 having a carrying handle 4 and a rear guiding handle 5.

In the intake region 6 leading to the carburetor of the two-stroke engine (not shown), an air filter 7 is provided which is located at inlet 8 of induction channel 9 preferably communicating directly with the carburetor. Opposite inlet opening 8 of induction channel 9 is a baffle wall 10 which extends into an arcuate wall 12 extending in the direction of air-intake opening 11 and defining one of the boundaries of the latter. Arcuate wall 12 and baffle wall 10 conjointly define a turn-around deflector 13. The turnaround deflector 13 of the air-intake arrangement of the invention arcuately guides the pulsating fuel particles buffeted back during the operation of the two-stroke engine along baffle wall 10 and arcuate wall 12. By means of the inflowing fresh air, the fuel particles are redirected in a controlled manner by 180° in a largely gaseous state and are returned to the two-stroke engine without depositing as drops in the intake region which otherwise could adversely affect the formation of an optimum fuel mixture.

For a proper return of the deflected gaseous fuel particles, turnaround deflector 13 may suitably include a flow chamber 14 bounded upwardly by baffle wall 10. The flow chamber 14 is connected directly to the inlet opening 8 of induction channel 9 and is also bounded by shielding wall 15 which forms a wall laterally to baffle wall 10. The shielding wall 15 can be advantageously of semicircular configuration and may have laterally splayed or arcuately splayed guide walls 16 extending in the direction toward air-intake opening 11 as shown in FIG. 3.

Figure 5:
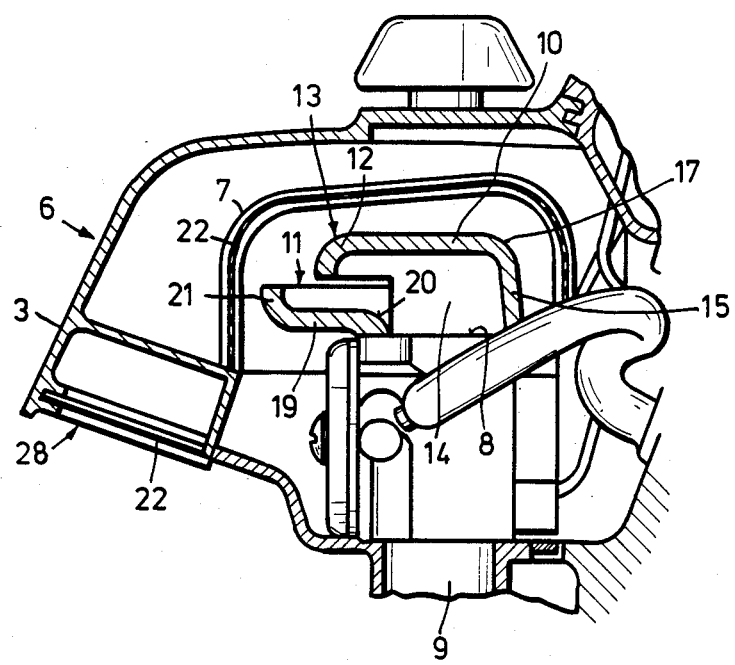
FIG. 5 is a section view of another embodiment of the air-intake arrangement of the invention disposed upstream of the two-stroke engine; and, FIG. 6 is a section view of still another embodiment of the air-intake arrangement of the invention disposed upstream of the two-stroke engine.

To provide a favorable direction of flow, the transition region where shielding wall 15 and baffle wall 10 blend into each other may be a curved wall 17. The radius of this curved wall 17 may be essentially equal to the radius of arcuate wall 12 (FIGS. 2 and 5). However, as in the embodiment of FIG. 6, it may also be advantageous to configure the radius of arcuate wall 12 larger than the radius of opposite curved wall 17.

In addition, a favorable flow guidance and turnaround of the fuel particles buffeted back through the induction channel 9 may be accomplished by providing baffle wall 10 with an arcuate portion 18 in the region between arcuate wall 12 and curved wall 17 so as to form a cupola-shaped dome (FIG. 4); that is, the arcuate portion 18 is disposed in the region of flow chamber 14 that is bounded in part by shielding wall 15.

Figure 6:
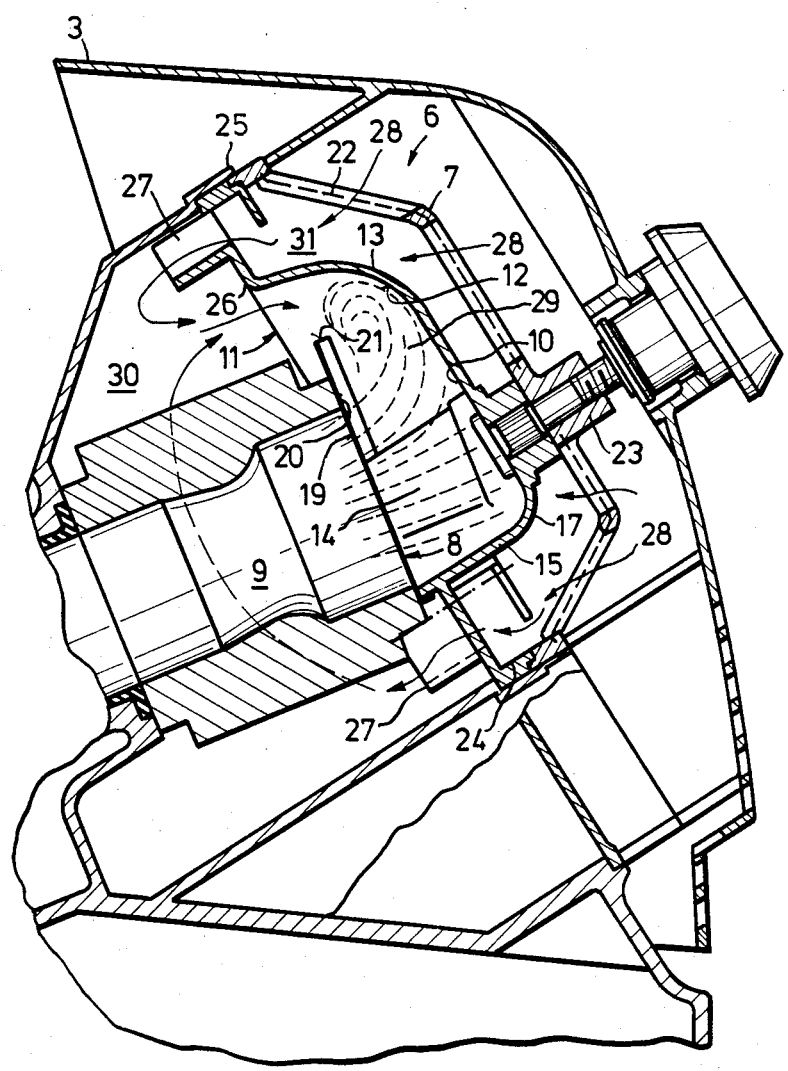

Moreover, to collect and redirect the fuel particles to be returned, it may be advantageous to provide turnaround deflector 13 with a collecting plate 19 on the side opposite arcuate wall 12 or baffle wall 10. In this arrangement, collecting plate 19 extends from inlet opening 8 of induction channel 9 to air-intake opening 11 and forms one of the boundaries thereof. To this end, collecting plate 19 may suitably have an inclined surface 20 extending in the direction of flow towards induction channel 9. Further, collecting plate 19 suitably has an upwardly extending guide edge 21 so as to have an approximately dish-shaped configuration (FIGS. 5 and 6). In the embodiment of FIG. 5, the forward area of guide edge 21 of collecting plate 19 is so long or protrudes to such an extent that it projects beyond arcuate wall 12 of turnaround deflector 13. In this embodiment, air-intake opening 11 is arranged to be offset relative to inlet opening 8 of induction channel 9 in a step-like manner.

In the embodiment of the air-intake arrangement of the invention of FIG. 5, turnaround deflector 13 includes baffle wall 10 and arcuate wall 12 as well as shielding wall 15. The turnaround deflector 13 and collecting plate 19 conjointly define a separate component located in the region of air filter 7. The filter 7 has a filter mesh 22 which covers the turnaround deflector 13 in the manner of a cap. However, the turnaround deflector 13 can be provided as a separate component outside of air filter 7, for example, in an intake tube or intake manifold.

In the embodiments of FIGS. 1 to 4 and 6, turnaround deflector 13 including baffle wall 10 and arcuate wall 12 is integrated into air filter 7. In the embodiment of FIGS. 1 to 4, baffle wall 10 is provided at an upper part 23 of the air filter 7. Upper part 23 has also a filter mesh 22. Collecting plate 19 is in the plane of a filter mesh 22 arranged at lower part 24 of air filter 7. Upper part 22 and lower part 24 are clipped together in the region of a partition plane 25.

In the embodiment of FIG. 6, turnaround deflector 13 including baffle wall 10, arcuate wall 12 and shielding wall 15 are provided on the lower part 24 of air filter 7 and below the cap-shaped filter mesh 22 of upper part 23. In this embodiment, collecting plate 19 with its guide edge 21 is preferably a bent sheet metal stamping and detachably secured to the wall of induction channel 9 at inlet opening 8. Arcuate wall 12 of turnaround deflector 13 extends to provide an insulating wall 26 which protrudes such as to project beyond shielding wall 15 in the manner of a cap. Because of this configuration, air-intake opening 11 which admits fresh air is thus offset relative to inlet opening 8 of induction channel 9 by an angle of about 180°. Partition wall 26 bounds one or several guide channels 27 leading to air-intake opening 11 in the area of air filter 7. The arrangement of partition wall 26 provides two chambers 30 and 31 interconnected by guide channels 27. This results in a significant attenuation of the noise produced by the inducted fresh air 28. Fresh air 28 flowing in through air-intake opening 11 entrains the returned fuel particles 29 in deflector 13 so that they are redirected towards the carburetor in a largely gaseous state when the pulsating induction stroke of the two-stroke engine occurs.

It is understood that the foregoing description is that of the preferred embodiments of the invention and that various changes and modifications may be made thereto without departing from the spirit and scope of the invention as defined in the appended claims.

What is claimed is:

1. An air-intake arrangement in combination with the engine of a hand-guided, engine-driven apparatus such as an engine-driven chain saw or the like, the engine being equipped with carburetor means for forming an air-fuel mixture, the carburetor means including an induction channel through which a pulsating flow of air for forming the mixture is drawn by suction developed by the engine and through which the engine periodically reverses the flow of air containing particles of the fuel in a direction opposite to a flow of incoming fresh air thereby causing the fuel particles to pass out through the inlet opening of the induction channel, the air-intake arrangement comprising:

an air filter disposed in said flow of fresh air ahead of said inlet opening; and, a baffle having a first arcuate wall portion facing said inlet opening and a second arcuate wall portion extending from said first arcuate wall portion, said first arcuate wall portion extending outwardly directly from the peripheral edge of said inlet opening in a continuous uninterrupted manner so as to cause the outermost portion thereof to face said opening, said second arcuate wall portion being configured so as to cause said wall portions to conjointly define a turnaround deflector for receiving the flow of fresh air and for guiding the reversed flow of air containing the fuel particles back toward said carburetor means and said engine.

2. The air-intake arrangement of claim 1, said turnaround deflector having an edge upstream from said inlet opening of said induction channel, said edge defining a boundary of an air-intake opening for the fresh air, said arcuate wall portion being in the vicinity of said air-intake opening.

3. An air-intake arrangement in combination with the engine of a hand-guided, engine-driven apparatus such as an engine-driven chain saw or the like, the engine being equipped with carburetor means for forming an air-fuel mixture, the carburetor means including an induction channel through which a pulsating flow of air for forming the mixture is drawn by suction developed by the engine and through which the engine periodically reverses the flow of air containing particles of the fuel in a direction opposite to a flow of incoming fresh air thereby causing the fuel particles to pass out through the inlet opening of the induction channel, the air-intake arrangement comprising:

an air filter disposed in said flow of fresh air ahead of said inlet opening; and, a baffle having a baffle wall portion facing said inlet opening and an arcuate wall portion extending from said baffle wall portion, said arcuate wall portion being configured so as to cause said wall portions to conjointly define a turnaround deflector for receiving the flow of fresh air and for guiding the reversed flow of air containing the fuel particles back toward said carburetor means and said engine, said turnaround deflector having an edge upstream from said inlet opening of said induction channel, said edge defining a boundary of an air-intake opening for the fresh air, said arcuate wall portion being in the vicinity of said air-intake opening; and, said turnaround deflector further including a shielding wall portion lying opposite said arcuate wall portion and next to said baffle wall portion, said wall portions conjointly defining a flow chamber for accommodating and guiding the flow of fresh air and said reversed flow of air containing the fuel particles to said carburetor means.

4. The air-intake arrangement of claim 3, said turnaround deflector being a single unitary member disposed in the air-intake region ahead of said carburetor means.

5. The air-intake arrangement of claim 3, said turnaround deflector being a member made up of a plurality of parts and disposed in the air-intake region ahead of said carburetor means.

6. The air-intake arrangement of claim 3, said turnaround deflector being mounted in said air filter.

7. The air-intake arrangement of claim 3, said arcuate wall portion having a predetermined radius, said shielding wall portion including a curved wall portion next to said baffle wall portion, said curved wall portion having a radius equal to or less than said predetermined radius.

8. The air-intake arrangement of claim 7, said baffle wall portion being disposed between said arcuate wall portion and said curved wall portion of said shielding wall portion, said baffle wall portion having an arcuate roof-like configuration.

9. The air-intake arrangement of claim 8, said shielding wall portion having a semi-circular configuration and said turnaround deflector including guide wall portions extending laterally from said shielding wall portion in splay-like fashion.

10. The air-intake arrangement of claim 9, comprising a receiving plate disposed adjacent said baffle wall portion and said arcuate wall portion for collecting the fuel particles to be returned to said carburetor means and said engine.

11. The air-intake arrangement of claim 10, said filter having a cap-like configuration and arranged so as to cover said turnaround deflector and said receiving plate in a cap-like manner.

12. The air-intake arrangement of claim 10, said air filter including: an upper filter mesh and a lower filter mesh disposed beneath said upper filter mesh; said turnaround deflector being configured as part of said upper filter mesh and said receiving plate being configured as part of said lower filter mesh.

13. The air-intake arrangement of claim 10, said receiving plate extending from said air-intake opening to said inlet opening of said induction channel, said receiving plate having a surface portion next to said inlet opening inclined toward said induction channel in the direction of the flow of the fresh air entering the induction channel.

14. The air-intake arrangement of claim 13, said receiving plate having a forward portion with a guide edge formed thereon in the region of said air-intake opening.

15. The air-intake arrangement of claim 13, said receiving plate having a forward portion with a guide edge formed thereon, said forward portion extending beyond said arcuate wall portion of said turnaround deflector so as to displace said air-intake opening in a step-like manner with respect to said induction channel.

16. An air-intake arrangement in combination with the engine of a hand-guided, engine-driven apparatus such as an engine-driven chain saw or the like, the engine being equipped with carburetor means for forming an air-fuel mixture, the carburetor means including an induction channel through which a pulsating flow of air for forming the mixture is drawn by suction developed by the engine and through which the engine periodically reverses the flow of air containing particles of the fuel in a direction opposite to a flow of incoming fresh air thereby causing the fuel particles to pass out through the inlet opening of the induction channel, the air-intake arrangement comprising:

an air filter disposed in said flow of fresh air ahead of said inlet opening; and, a baffle having a baffle wall portion facing said inlet opening and an arcuate wall portion extending from said baffle wall portion, said arcuate wall portion being configured so as to cause said wall portions to conjointly define a turnaround deflector for receiving the flow of fresh air and for guiding the reversed flow of air containing the fuel particles back toward said carburetor means and said engine;

said turnaround deflector having an edge upstream from said inlet opening of said induction channel, said edge defining a boundary of an air-intake opening for the fresh air, said arcuate wall portion being in the vicinity of said air-intake opening; and, a receiving plate disposed adjacent said baffle wall portion and said arcuate wall portion for collecting the fuel particles to be returned to said carburetor means and said engine, said arcuate wall portion having a partition wall extending therefrom and projecting outwardly beyond said receiving plate, said partition wall being configured so as to displace said air-intake opening by approximately 180° with respect to said inlet opening.

17. The air-intake arrangement of claim 16, said air filter including: an upper part made up of a cap-like filter mesh; and, a lower part disposed beneath said upper part; said deflector including said arcuate wall portion, said baffle wall portion, said partition wall extending from said arcuate wall portion all being configured as said lower part of said air filter.

18. The air-intake arrangement of claim 17, wherein said apparatus has a housing accommodating the air-intake arrangement, said housing and said partition wall conjointly defining labyrinth means for conducting the fresh air to said air-intake opening.

19. The air-intake arrangement of claim 18, said partition wall and said housing conjointly defining two chambers for dividing the quantity of air drawn into said air-intake opening.

20. An air-intake arrangement in combination with the engine of a hand-guided, engine-driven apparatus such as an engine-driven chain saw or the like, the engine being equipped with carburetor means for forming an air-fuel mixture, the carburetor means including an induction channel through which a pulsating flow of air for forming the mixture is drawn by suction developed by the engine and through which the engine periodically reverses the flow of air containing particles of the fuel in a direction opposite to a flow of incoming fresh air thereby causing the fuel particles to pass out through the inlet opening of the induction channel, the air-intake arrangement comprising:

an air filter disposed in said flow of fresh air ahead of said inlet opening;

a plate-like member extending outwardly and away from a portion of the periphery of said inlet opening; and, a baffle extending outwardly directly from the remainder of said periphery in an uninterrupted curve continuously closing upon itself so as to extend over said plate-like member to conjointly define therewith an air-intake opening for admitting said flow of fresh air; and, said baffle being configured to have a scoop-loop shape over said inlet opening and said member to thereby define a flow chamber, said baffle having an inside wall surface curved to guide and direct said fuel particles into the flow of fresh air entering said flow chamber through said air-intake opening whereby said fuel particles are redirected in a controlled manner back to said induction channel without depositing as drops in the region ahead of said inlet opening.

* * * * *

UNITED STATES PATENT AND TRADEMARK OFFICE
CERTIFICATE OF CORRECTION

PATENT NO. : 4,600,418

DATED : July 15, 1986

INVENTOR(S) : Reinhard Gommel et al

It is certified that error appears in the above-identified patent and that said Letters Patent is hereby corrected as shown below:

In column 8, line 14: delete "scoop-loop" and substitute -- scoop-like -- therefor.

Signed and Sealed this

First Day of September, 1987

Attest:

DONALD J. QUIGG

Attesting Officer

Commissioner of Patents and Trademarks